United States Patent [19]

Nutter

[11] Patent Number: 5,013,491
[45] Date of Patent: May 7, 1991

[54] APPARATUS FOR DISTRIBUTING LIQUID IN GAS-LIQUID CONTACT APPARATUS, AND METHOD FOR MAKING IT

[76] Inventor: Dale E. Nutter, 7935 S. New Haven, Tulsa, Okla. 74136

[21] Appl. No.: 492,848

[22] Filed: Mar. 13, 1990

Related U.S. Application Data

[63] Continuation-in-part of Ser. No. 363,786, Jun. 9, 1989, abandoned.

[51] Int. Cl.⁵ .............................................. B01F 3/04
[52] U.S. Cl. ........................................ 261/97; 29/463
[58] Field of Search ..................... 261/97, 110, 114.2; 72/75, 51, 120; 29/463

[56] References Cited

U.S. PATENT DOCUMENTS

| | | | |
|---|---|---|---|
| 2,142,231 | 1/1939 | Allen | 261/114.2 |
| 2,317,198 | 4/1943 | Kasper | 72/51 |
| 2,422,300 | 6/1947 | Glitsch | 261/114.2 |
| 2,578,881 | 12/1951 | Dunn | 261/114.2 |
| 2,842,702 | 7/1958 | Titcomb et al. | 29/463 |
| 2,845,889 | 8/1958 | Jones | 72/51 |
| 3,446,489 | 5/1969 | Leva | 261/97 |
| 4,472,325 | 9/1984 | Robbins | 261/97 |
| 4,512,178 | 4/1985 | Blevins et al. | 72/75 |
| 4,557,877 | 12/1985 | Hotstetter | 261/97 |
| 4,689,183 | 8/1987 | Helms | 261/97 |
| 4,836,989 | 6/1989 | Aly et al. | 261/97 |
| 4,909,967 | 3/1990 | Binkley et al. | 261/97 |

FOREIGN PATENT DOCUMENTS 3013783 10/1981 France .................................. 261/97

Primary Examiner—Tim Miles
Attorney, Agent, or Firm—Beveridge, DeGrandi & Weilacher

[57] ABSTRACT

In a gas-liquid contact apparatus, liquid is distributed onto packing media by vertical flow tubes mounted on a horizontal deck. Each flow tube has a beveled upper end, an upper portion above the deck provided with one or more vertical slots for admitting liquid into the tube, and a lower portion extending below the deck for releasing liquid onto the packing media. The lower portion of the tube may have internal vertical louvers and a nontubular depending tail portion. The tube is precisely immovably secured in both orientation and elevation to the deck by an external circumferential rib bearing against the upper surface of the deck, and one or more staking protrusions that bear against the lower surface of the deck. The tube is made from a flat blank of sheet material which has a first pair of opposed edges provided with locking tabs, a second pair of opposed edges that eventually form the top and bottom ends of the tube, and a rib that is generally perpendicular to the first pair of opposed edges. The blank is deformed to form a tube in which the locking tabs engage each other and the rib is positioned externally and circumferentially. The tube is inserted in a deck opening until the rib engages the upper surface of the deck, and the tube is locked in its precise final position by protrusions that engages the lower surface of the deck. The tubes are field-replaceable.

16 Claims, 3 Drawing Sheets

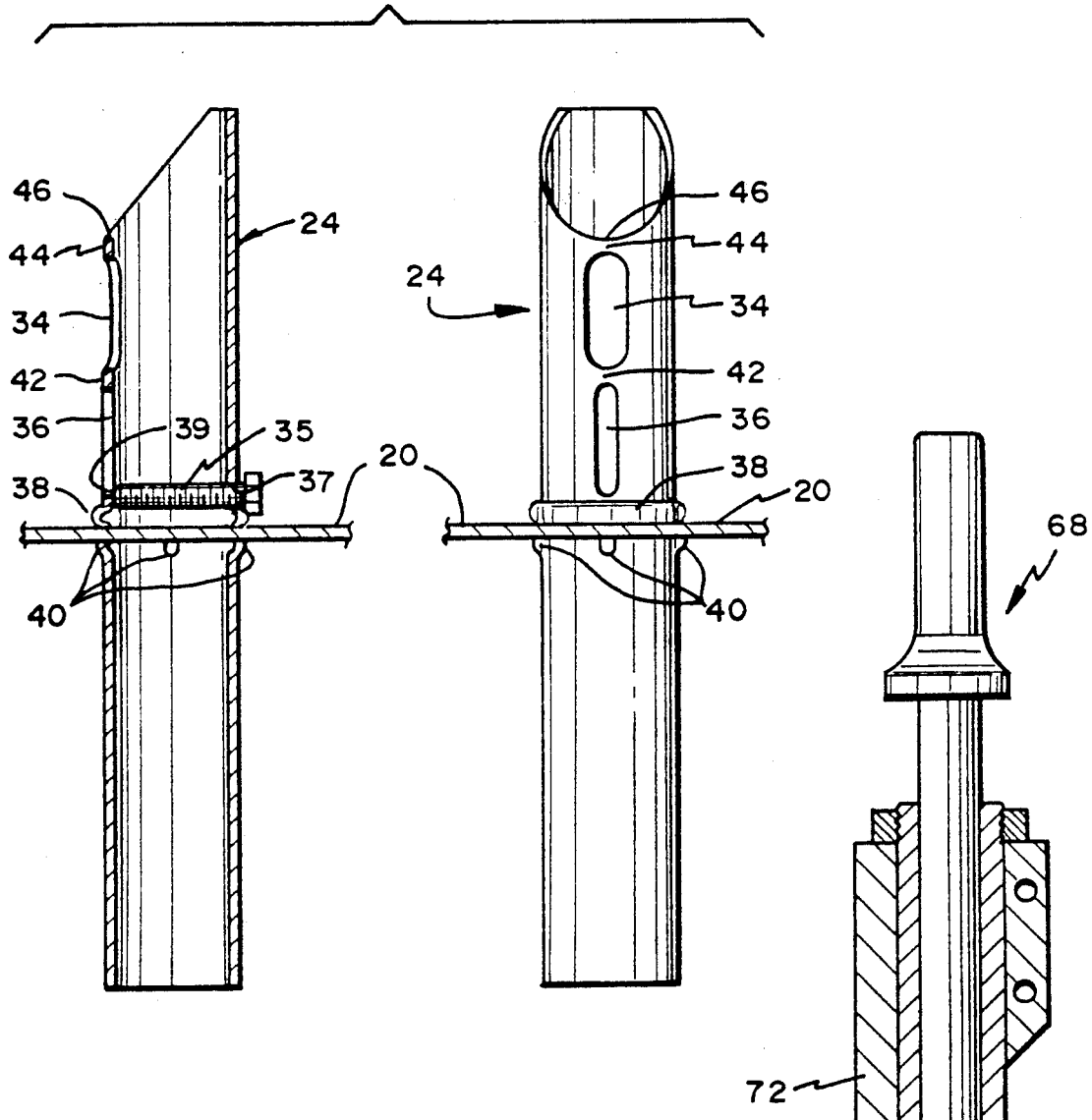

APPARATUS FOR DISTRIBUTING LIQUID IN GAS-LIQUID CONTACT APPARATUS, AND METHOD FOR MAKING IT

REFERENCE TO RELATED APPLICATION

This is a Continuation-In-Part of United States patent application No. 07/363,786 filed Jun. 9, 1989, now abandoned.

BACKGROUND OF THE INVENTION

This invention relates to gas-liquid contact apparatus, and it particularly pertains to the structure and manufacture of the parts that distribute liquid onto a bed of packing media.

In a typical gas-liquid contact apparatus, packing media is contained in a sealed, vertically elongated vessel frequently referred to in the industry as a column or tower. Packings may be structured packings such as corrugated sheets of screen or sheet metal, or random particles such as rings or saddles types, all of which are well known in the art. Liquid is usually distributed on the upper surface of the packing media by an orifice pan, trough or spray nozzle distributor. Gas is introduced to the vessel through a gas inlet nozzle, flows through the packing media where it contacts the liquid on the packing media surfaces, and then exits through a gas outlet nozzle in the vessel. As the liquid moves downwardly through the packing media under the influence of gravitational forces, it wets the surface of the packing media, forming a renewing liquid surface to promote the effective contact between the fluids. After the liquid passes through the packing, it flows to a liquid outlet means. Normally, the gas flows countercurrent to the liquid flow, but cocurrent arrangements are sometimes used.

The present invention is directed to improvements in a type of distributor shown in Robbins' U.S. Pat. No. 4,472,325, assigned on its face to The Dow Chemical Company. In this known apparatus, liquid flows onto the packing media from vertical seamless tubes which are mounted on liquid-receiving pans. These tubes protrude above and below the decks of their respectively pans, and their upper portions have vertical slots milled therein to meter the flow of liquid into the tubes. These tubes are precisely welded into elevated positions.

According to current practices, the manufacture of flow tube type distributors is a costly and labor intensive task, requiring each tube to be precisely cut, slotted, and welded to the deck. Unless extreme care is taken, there will be maldistribution of the liquid due to unequal slot sizes, unequal slot elevations, and unequal elevations of the upper edges of the tubes. Maintenance is expensive because, when flow tube replacement is required, the entire distributor must be removed from the column and replaced.

An objective of the invention is to provide a distributor which uniformly distributes liquid to the packing media in the vessel throughout a wide range of liquid flow including very low rates.

Another object is to provide a manufacturing method which is simple, relatively inexpensive, and is capable of producing distributors of varying dimensions from a wide variety of materials.

A further object is to provide a distributor which, relative to existing distributors of this type, is less expensive to manufacture and provides more uniform liquid distribution.

Still another object is to provide a distributor in which fouled or corroded flow tubes are field replaceable in the respect that they can be removed and replaced in the field, without removing the deck from its column supports.

SUMMARY OF THE INVENTION

As mentioned above, this invention involves improvements in the structure and manufacture of a known type of distributor in which a deck has openings which receive flow tubes. Each flow tube has a vertically elongated slot located above the deck for admitting liquid into the tube, and each tube has an opening below the deck for releasing liquid into a bed of packing media thereunderneath.

In one respect, the invention pertains to an improvement in the configuration of the above-described type of distributor. Above the deck, each tube has an external circumferential rib that lies against a surface of the deck. This fixes the tubes relative to the deck so that their liquid inlet openings are set accurately at a uniform elevation. On the opposite side of the deck, each tube has one or more locking protrusions that extend radially outwardly at a position spaced from the rib. These locking protrusions bear against the other surface of the deck so that the tube is immovably secured to the deck by the rib and protrusions.

Preferably, each tube has a longitudinal seam provided with a plurality of interfitting locking tabs. The tube may have at least one internal longitudinal louver to deter helical flow, a movable obstruction member at a lower portion of the slot to adjust the flow of liquid into the slot, and an upper end that is beveled in the respect that it lies substantially in a plane that is inclined relative to vertical and horizontal planes. The tube may have a movable obstruction member that may be a screw that is threaded to the tube at a location diametrically opposed to the slot. The screw has its end positioned at the lower end of the slot so that rotation of the screw changes the position of its flow-obstructing end relative to the slot. The tube may have a web that defines the upper end of the slot and accurately maintains the slot at a constant width during manufacture, installation and use. Multiple slots may be provided, vertically aligned with each other and with the lowermost portion of the beveled upper end of the tube.

For different applications, the slots may be of different widths, but they will be as nearly identical as commercially possible for each specific design application.

The invention also involves a manufacturing method which includes the steps of forming a substantially flat blank of sheet material that has a first pair of opposed edges, a second pair of opposed edges, and a rib that is generally perpendicular to the first pair of opposed edges. Due to the blank punching operation, the upper and lower ends of the tube will be relatively smooth. The blank is deformed to bring the first pair of opposed edges together to form a tube in which the rib is positioned externally and circumferentially. The tube is inserted into an opening in a deck member until the rib engages the deck to prevent further insertion, and then the tube is locked to the deck in this final position.

Preferably, the blank-forming step may be performed to give the blank an inwardly curved portion on one edge of the second pair of opposed edges, and this inwardly curved portion becomes the beveled upper end of the tube. The blank-forming step may also provide locking tabs on the first pair of opposed edges, and these tabs lockingly engage each other during the tube-forming step. The locking of the tube to the deck is effected by forming radical protrusions which engage the deck so that the deck will be located between the rib and the protrusions. Eventually, the deck is mounted in a gas-liquid contact apparatus, liquid is introduced onto the deck so that liquid flows into and through the tube, and then the tube releases liquid uniformly onto packing media in the apparatus.

From another perspective, the invention involves a method of forming a liquid distributor including the steps of providing a deck which has holes formed therein, providing a set of uniform flow tubes each of which has a liquid inlet opening and an external circumferential rib, inserting each flow tube in a hole in the deck until it reaches a precise position where its rib engages the deck to position its liquid inlet opening and its upper edge at precise distances from the deck, and locking each tube to the deck with an external locking protrusion which is weldlessly formed in the tube and engages the deck. All flow tubes on the deck have their liquid inlet openings spaced from the deck by said precise distance, and the deck lies between the external circumferential rib and the locking protrusion. Preferably, the tubes are die formed for uniformity.

Another aspect of the invention involves a method of refurbishing liquid distributors which have previously been mounted in columns of gas-liquid contacting apparatus. According to this method, the deck remains in the column at all times. The original tubes are removed from their respective holes in the deck, and a set of uniform tubes are provided which have the liquid inlet openings and external circumferential ribs formed therein. Each replacement tube is inserted into a hole in the deck until its external circumferential rib engages the deck to position the tube's liquid inlet opening and its upper edge at precise elevations relative to the deck. The replacement tube is then locked to the deck with a weldlessly formed external protrusion which is located so that the deck is between the rib and the protrusion.

BRIEF DESCRIPTION OF THE DRAWINGS

FIG. 3 is a sectional view of two flow tubes connected to the deck.

FIG. 6 is a partially sectioned view of a staking tool used to attach the flow tubes to a deck.

DETAILED DESCRIPTION

Figure 1:
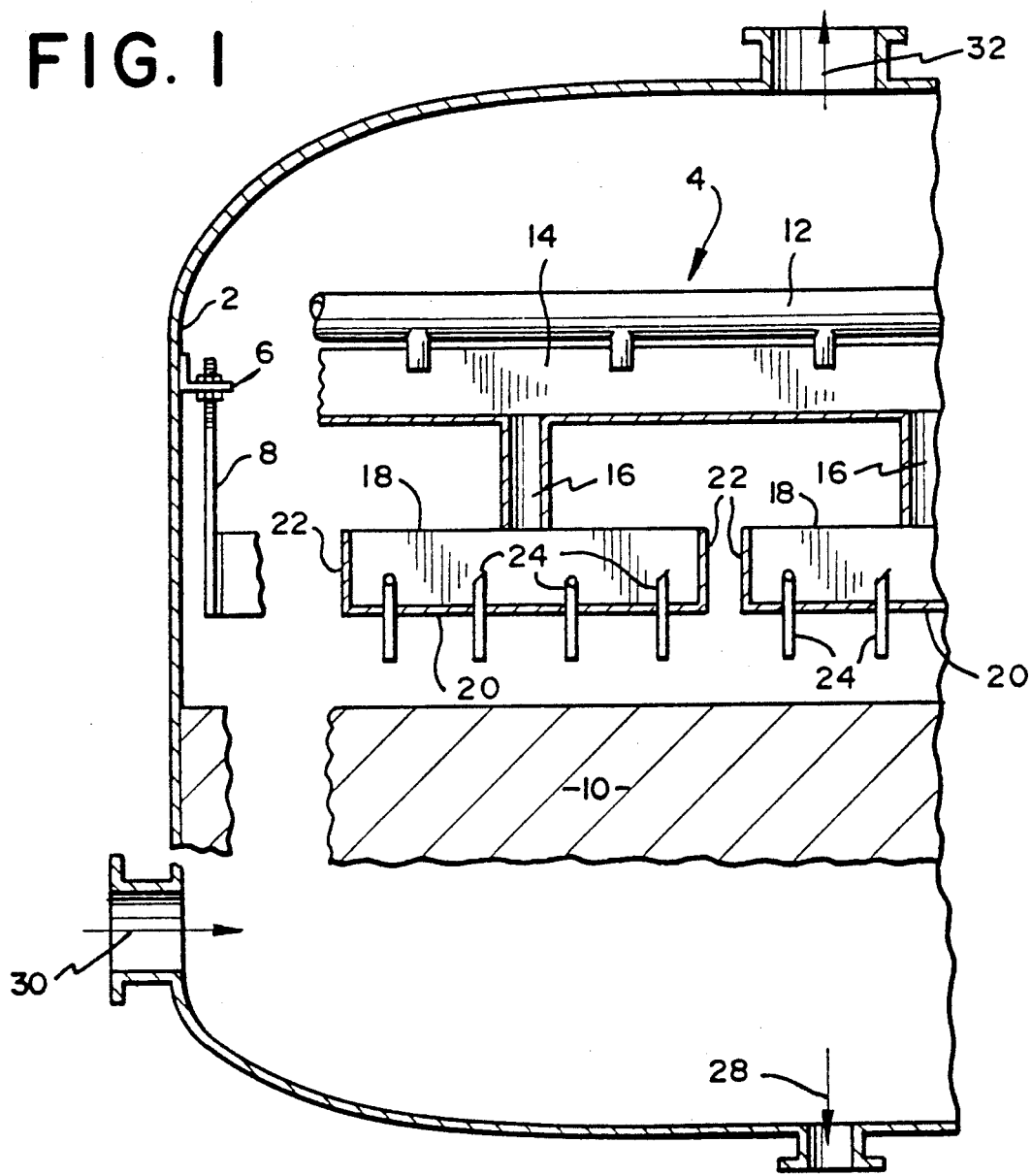
FIG. 1 is a sectional view of a portion of a gas-liquid contact apparatus constructed according to the invention.

FIG. 1 shows the shell of a pressure vessel 2 in which the liquid distributor 4 is suspended from a support ring 6 by threaded rods 8. The distributor 4 is placed above the packing media 10 which, as previously mentioned, can be random or structured packing. A pipe 12 introduces liquid into a primary trough 14 that has outlets leading to secondary throughs 16 which lie directly above the distributor pans 18. Each pan 18 has a horizontal deck 20, a vertical wall 22 around the deck perimeter, and a plurality of flow tubes 24 that extend through the deck. The apparatus has a liquid outlet schematically represented by arrow 28, a lower gas inlet 30, and an upper gas outlet 32.

Figure 2:
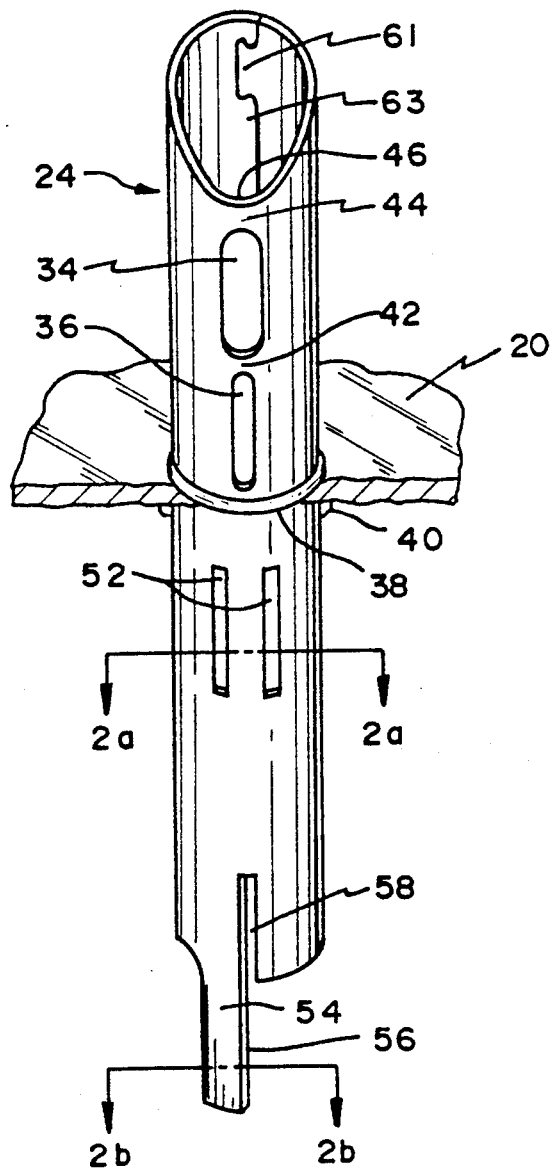
FIG. 2 is a perspective view of a flow tube used in the apparatus of the invention.

A typical flow tube 24 is shown in FIG. 2. It has a cylindrical cross section, liquid metering slots 34 and 36 that permit liquid on the deck 20 to flow into the tube, and an open lower end below the deck for releasing liquid into the bed 10 of packing media. The tube 24 has an external circumferential rib 38, and a lower surface of this rib bears against the upper surface of the deck 20 to fix the position of the tube relative to the deck. Beneath the deck, the tube has one or more staking dimples 40 which serve as locking protrusions. They extend radially outwardly at a position spaced from the rib 38, and they bear against the lower surface of the deck 20 to secure the tube immovably to the deck. The staking operation does not significantly change the thickness of the sheet material at the dimples so, even after staking, the entire tube 24 has a substantially constant wall thickness.

As can be seen in FIGS. 2 and 3, about 75% of the upper end of the tube is beveled in the respect that it lies substantially in a plane that is inclined relative to vertical and horizontal planes. The remaining 25% of the upper end of the tube, i.e. about 90° of the tube circumference, lies in a horizontal plane.

The tube shown in FIG. 2 has an upper slot 34 and a lower slot 36. The lower slot 36 extends upwardly from the rib 38 to a web 42 which lies between the two slots. The upper slot 34 is wider than the lower slot 36, and its upper end is defined by the web 44. These webs 42 and 44 prevent the tube 24 from deforming in a way that would change the slot widths during manufacture, installation, and use. The slots 34 and 36 are vertically aligned with each other and with the lowermost portion 46 of the beveled upper end of the tube.

In order to affect the flow of liquid into the slot 36, a machine screw 35 may be mounted on the tube 24. The shank of the screw is threaded in a hole 37 that is diametrically opposed to the slot 36, and the end 39 of the screw 35 lies in or adjacent to the lower end of the slot 36. When the screw is rotated, its end 39 moves toward and away from the slot, and this change in position can influence the flow rate through the tube orifice and into the packing media.

Figure 2A:
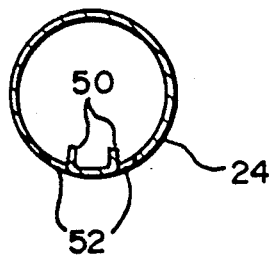
FIG. 2a is a sectional view of the tube as seen along the line 2a—2a in FIG. 2.
Figure 2B:
FIG. 2b is a sectional view of the tube in FIG. 2, taken along the line 2b—2b.

Beneath the deck, the tube may have internal louvers 50 which extend radially inwardly as shown in FIG. 2a. These louvers are formed by making a horizontally facing vertically elongated U-shaped cut in the tube material, and bending the material inwardly, thus leaving the openings 52 which can be seen in FIG. 2. At the lower end of the tube 24, there may be a depending nontubular tail portion 54. It has a main portion which is longitudinally aligned with the main portion of the tube, and it also includes a louver 56 which gives the depending tail portion 54 a generally L-shaped configuration as shown in FIG. 2b. This louver 56 extends upwardly into the circular portion of the tube, thus forming an open-ended vertical slot 58 at the lower end of the circular portion. The purpose of the louvers 50 is to deter helical flow within the tube. When the louvers 50 are at the positions shown in FIG. 2, they are effective for this purpose only at very low flow rates where the liquid entering the metering slot remains on the slotted wall rather than flowing through the center of the tube or across to the diametrically opposite internal surface of the tube 24.

The flow tubes shown in FIG. 3 differ from the tube of FIG. 2 in the respect that the lower parts of the tubes are not provided with louvers and tail portions.

Figure 4:
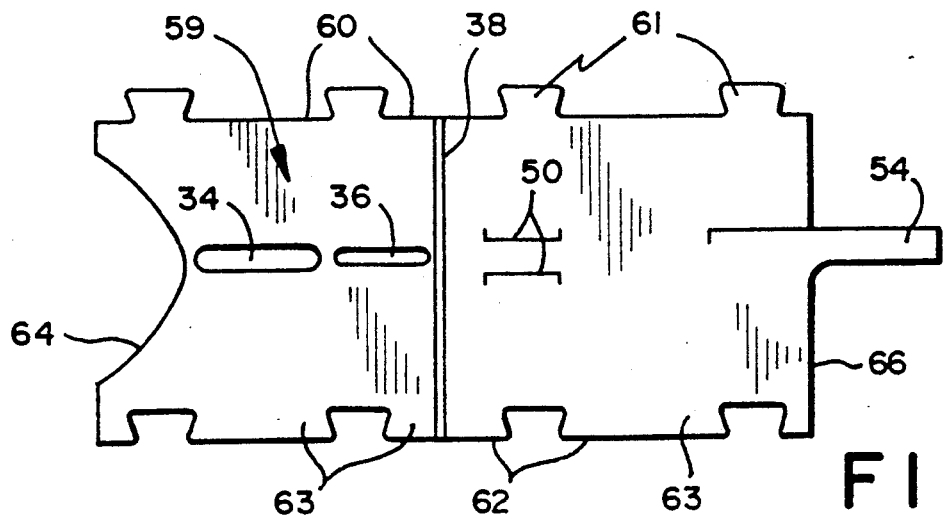
FIG. 4 is a plan view of a blank used in forming a tube according to the invention.
Figure 5:
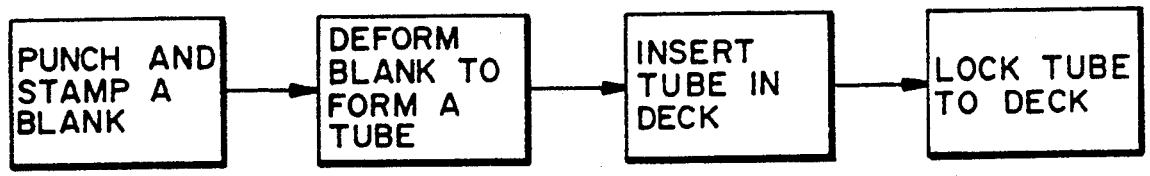
FIG. 5 is a block diagram showing some steps in the manufacturing process.

The flow tubes 24 shown in FIGS. 2 and 3 are preferably formed of sheet material, thus giving the design engineers an opportunity to use materials that are not commercially available as tubing. The manufacturing process includes the steps of forming a substantially flat blank such as the one shown at 59 in FIG. 4. The blank is formed of a selected sheet material, and it is provided with a rib 38 that is generally perpendicular to a first pair of opposed edges 60 and 62 of the blank. These opposed edges 60 and 62 are formed with locking tabs 61 and 63. As can be seen in FIG. 4, the blank 59 also has a second pair of opposed edges 64 and 66. Edge 64 is formed so that it has an inwardly curved portion which eventually becomes the beveled upper end of the tube. Edge 66 is provided with the tail portion 54 which depends from the lower end of the completed flow tube 24. The blank 59 is formed in conventional equipment such as a punch press with reciprocating dies. The upper and lower ends of a tube formed from the blank will be relatively smooth, and the upper and lower edges, viewed in planes that include the central longitudinal axis of the tube, will be normal to the tube's central longitudinal axis. When the blank is formed in the punch press, it is provided with one or more of the liquid metering slots 34, 36, and possibly with the louvers 50 and the tail portion 54. In a tube-forming step, the blank 59 is deformed into the tubular form which preferably is circular in cross section. During this tube-forming step, the locking tabs 61 and 63 are brought into locking engagement with each other.

Circular tube-receiving openings are punched in the deck, and the formed tubes 24 are then inserted into these openings and locked to the deck. These deck openings are smaller than the ribs 38 of the tubes. When a tube reaches a final position where the rib 38 engages the deck to prevent further insertion, a staking tool is used to form the dimples 40. Thus, it is possible to have a weldless tube, weldlessly attached to the deck of the distributor pan.

As shown in FIG. 6, the staking tool 68 has a tubular body 70, an external positioning collar 72 with an inclined lower edge, four staking pins 73 that are radially slidable in the body 70, and a vertically slidable plunger 74 that has a tapered surface 76 for engaging the pins 73.

The collar 72 limits the distance the body 70 can be inserted into a flow tube, so it determines the location of the staking pins 73 and the dimples they produce. The collar 72 can be secured at different positions lengthwise of the tool body 70 so that the pins 73 will be properly positioned for different deck thicknesses and flow tube lengths.

In use, the staking tool 68 is inserted into the upper end of a flow tube until the lower edge of the positioning collar 72 contacts the upper edge of the tube, and the pins 73 are immediately below the lower surface of the deck 20. While exerting a downward force on the body 70 to press the rib 38 of the flow tube 24 firmly against the upper surface of the deck, the plunger 74 is driven down by an air hammer. This causes the tapered surface 76 to drive the pins 73 radially outwardly to form the staking dimples 40 and lock the flow tube 24 in position.

To remove a flow tube from the deck, by an impact tool that slips over the tube, radially crushes the tube and extracts it.

Weldless tubes can be replaced in commercial applications with a special set of tools designed to accurately position and secure the replacement tubes in an existing (installed) distributor.

When the distributor apparatus is installed in the vessel of a gas liquid contact apparatus, liquid from pipe 12 flows from primary trough 14 to secondary trough 16 and then into the pans. When the depth of the liquid in the pans is at a minimum, it will flow through the lower metering slot 36 into the tube 24, and then be released from the open lower end of the tube into the packing media 10. At low flow rates, any liquid tending to flow in a helical direction inside the tube will be deterred from doing so by the louvers 50 and the tail piece 54. If the liquid in the pans is sufficiently deep, the upper metering slot 34 will come into play. This upper slot may be widened to provide greater flow which is uniform with increasing head which will permit an effective, gradually regulated flow transition to the beveled portion at the top of the tubes. This principal of staging different sizes of orifice holes has been used in the art with flow tubes which have circular metering apertures; however with such circular orifices, an abrupt non-uniform flow transition occurs when the head is at the orifice elevation. If the depth of the liquid exceeds the height of the lowermost portion 46 of the beveled upper end of the tube, liquid will also flow into the open upper end of the tube 24 which then acts as a further liquid inlet opening. Initially, flow through the slots 34 and 36 will be irregular in the larger tube cross section, so it will tend to rinse out any particulate materials that may bridge or clog the metering slots.

After some time in operation, distributors' orifices tend to corrode or foul because of the nature of the process operation. When these effects occur it is necessary to clean and often replace the entire distributor apparatus. With the weldless tubes described herein it is possible to remove and replace the old weldless tubes with new ones without removing the distributor from the column. This rework can be done with a simple set of air operated installation and removal tools. Since distribution performance quality is primarily related to the uniformity of size and elevation of the orifices, one can effectively rework the distributor by replacing the flow tubes in this manner.

A suitable tube may be formed of 0.024 inch thick 304 stainless steel or other metal strip stock. The slots 34 and 36 should have a height of at least 19 mm. Slot 34 may be 3 mm wide; and, slot 36 may be 5 mm wide. The flow tube has a nominal height of five inches and an outside diameter of ¾ inches. By selecting suitable slot widths, slot heights, tube diameters and tube heights, uniform distribution can be achieved throughout a wide range of flow rates.

When flow tubes are precisely die formed and weldlessly installed in this manner, the orifice size and orientation can be manufactured and installed to provide ±2% mechanical variation from tube to tube. This accuracy is necessary to obtain the necessary tolerance to meet performance specifications. See Perry, D., Nutter, D. E., Hale, A. D., "Liquid Distribution for Optimum Packing Performance," *Chemical Engineering Progress*, 86, p. 30 (January 1990).

Apparatus of the type disclosed in this specification readily lends itself to convenient refurbishing to replace tubes which have become corroded or fouled. Without removing the deck from the deck supports in the column, the original tubes are removed from their respective holes in the deck, and replacement tubes with liquid inlet openings and external circumferential ribs are each inserted in a hole in the deck until its external circumferential rib engages the deck to position its liquid inlet opening at precise elevations relative to the deck. The replacement tube is locked to the deck with an external locking protrusion weldlessly formed in the tube. The deck is located between the rib and the protrusion for secure retention.

Persons familar with the field of the invention will realize that it is capable of many modifications which differ from the illustrated embodiment. As a practical matter for most purposes, the internal louvers and depending tail portion are not often required. From a production standpoint, the circumferential rib may be formed after the blank is bent into its tubular form. The ribs and protrusions may have configurations different from those illustrated in this specification. As these and many other changes are anticipated, it is emphasized that this invention is not limited to the disclosed embodiments but embraces a wide variety of apparatuses and methods which fall within the spirit of the following claims.

I claim:

1. Apparatus for distributing liquid onto a bed of packing media in a gas-liquid contact apparatus, comprising:
    a deck having first and second surfaces and being provided with a plurality of openings,
    a plurality of flow tubes positioned in said deck, each of said flow tubes having a vertically elongated slot located above the deck for admitting liquid into the tube, each of said flow tubes having an outlet opening below the deck for releasing liquid into a bed of packing media in the gas-liquid contact apparatus,
    each of said tubes having an external circumferential rib spaced from said slot a distance which is uniform for all of said flow tubes in the deck, said rib having a surface that bears against the first surface of the deck to fix the tube to the deck and accurately set the orientation and elevation of the slot relative to the deck,
    each of said tubes having at least one external locking protrusion at a position spaced axially from said rib, said locking protrusion bearing against the second surface of the deck, whereby each said tube is immovably secured to the deck by said rib and said protrusion.

2. Apparatus according to claim 1 wherein, to deter helical flow inside the tube, there is at least one internal longitudinal louver.

3. Apparatus according to claim 1 wherein the tube has a lower end provided with a depending nontubular tail portion.

4. Apparatus according to claim 1 having an adjustable obstruction means at a lower portion of said slot, said obstruction means being movable relative to said slot to affect the flow of liquid into said slot.

5. Apparatus according to claim 4 wherein the adjustable obstruction means is a screw that has one end positioned at the lower end of the slot, said screw being threaded to the tube at a location diametrically opposed to said slot, whereby rotation of said screw changes the position of said one end relative to said slot.

6. Apparatus according to claim 1 wherein the tube has a longitudinal seam.

7. Apparatus according to claim 6 wherein the seam has a plurality of interfitting locking tabs.

8. Apparatus according to claim 1 wherein the tube has an upper end that is beveled in the respect that it lies substantially in a plane that is inclined relative to vertical and horizontal planes.

9. Apparatus according to claim 1 having a web that defines an upper end of the vertically elongated slot.

10. Apparatus according to claim 9 wherein the tube has a longitudinal seam.

11. Apparatus according to claim 10 wherein the seam has a plurality of interfitting locking tabs.

12. Apparatus according to claim 9 having two said vertically elongated slots and two said webs, said vertically elongated slots being upper and lower slots that are vertically aligned with each other.

13. Apparatus according to claim 12 wherein the tube has an upper end that is beveled in the respect that it lies substantially in a plane that is inclined relative to vertical and horizontal planes, said upper end having a lowermost portion that is vertically aligned with said slots.

14. Apparatus according to claim 1 in combination with a bed of liquid packing media, said bed of liquid packing media being positioned beneath said distributing apparatus.

15. A method of refurbishing a liquid distributor mounted in a column of a gas-liquid contact apparatus, said distributor having a plurality of flow tubes which have liquid inlet openings and are mounted in holes formed in a deck, said method including the following steps which are performed while the deck remains in the column:
    removing said tubes from their respective holes in the deck, providing a set of uniform replacement tubes which have liquid inlet openings and external circumferential ribs formed therein, inserting each replacement tube into a hole in the deck until its external circumferential rib engages the deck to position its liquid inlet opening at a precise elevation relative to the deck, and locking the replacement tube to the deck with an external locking protrusion which is weldlessly formed in the tube and engages the deck, said deck being located between said rib and said protrusion.

16. A method according to claim 15 wherein each of the flow tubes is made by forming a blank from a piece of sheet material, and deforming the blank into a tubular shape.

* * * * *